O. H. HESSE.
TRAILER RUNNING GEAR AND TOWING CONNECTION.
APPLICATION FILED APR. 21, 1916.
1,212,949.
Patented Jan. 16, 1917.
3 SHEETS—SHEET 3.
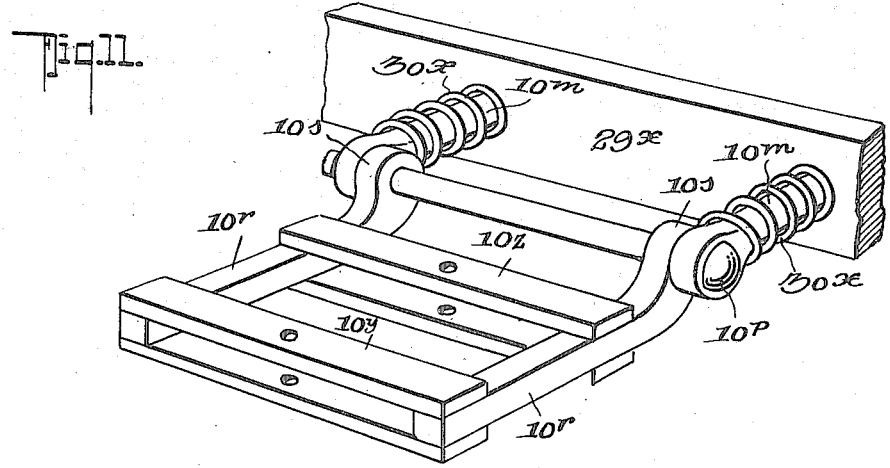
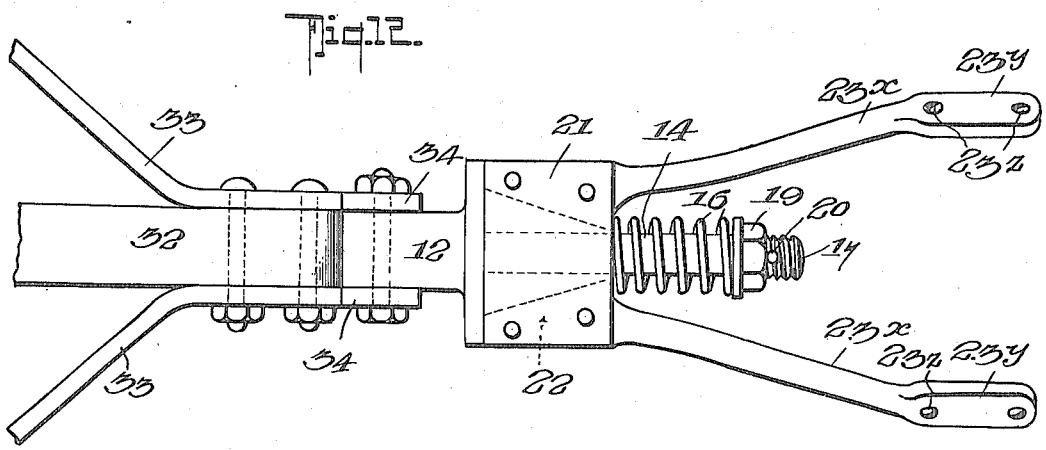
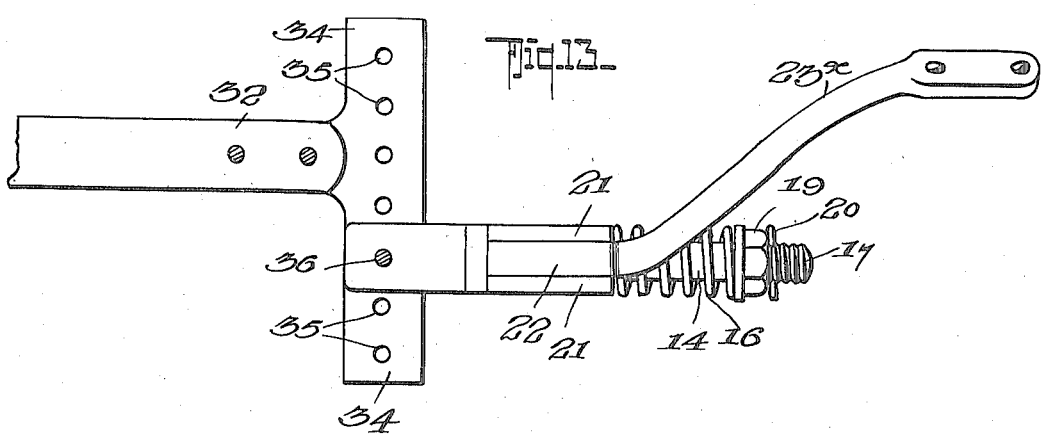
INVENTOR
Otto H. Hesse.
BY
Fred G. Dieterich
ATTORNEYS

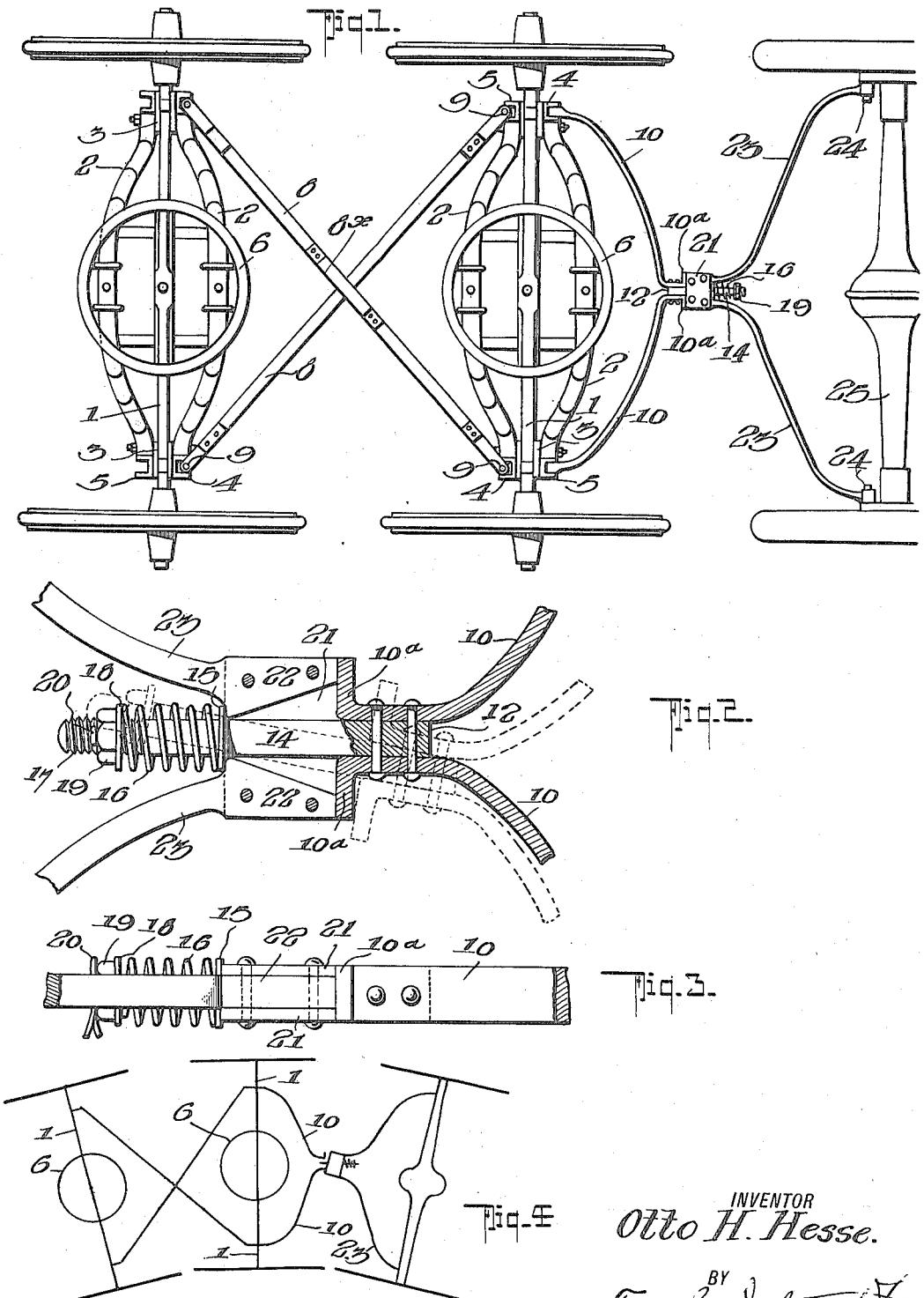

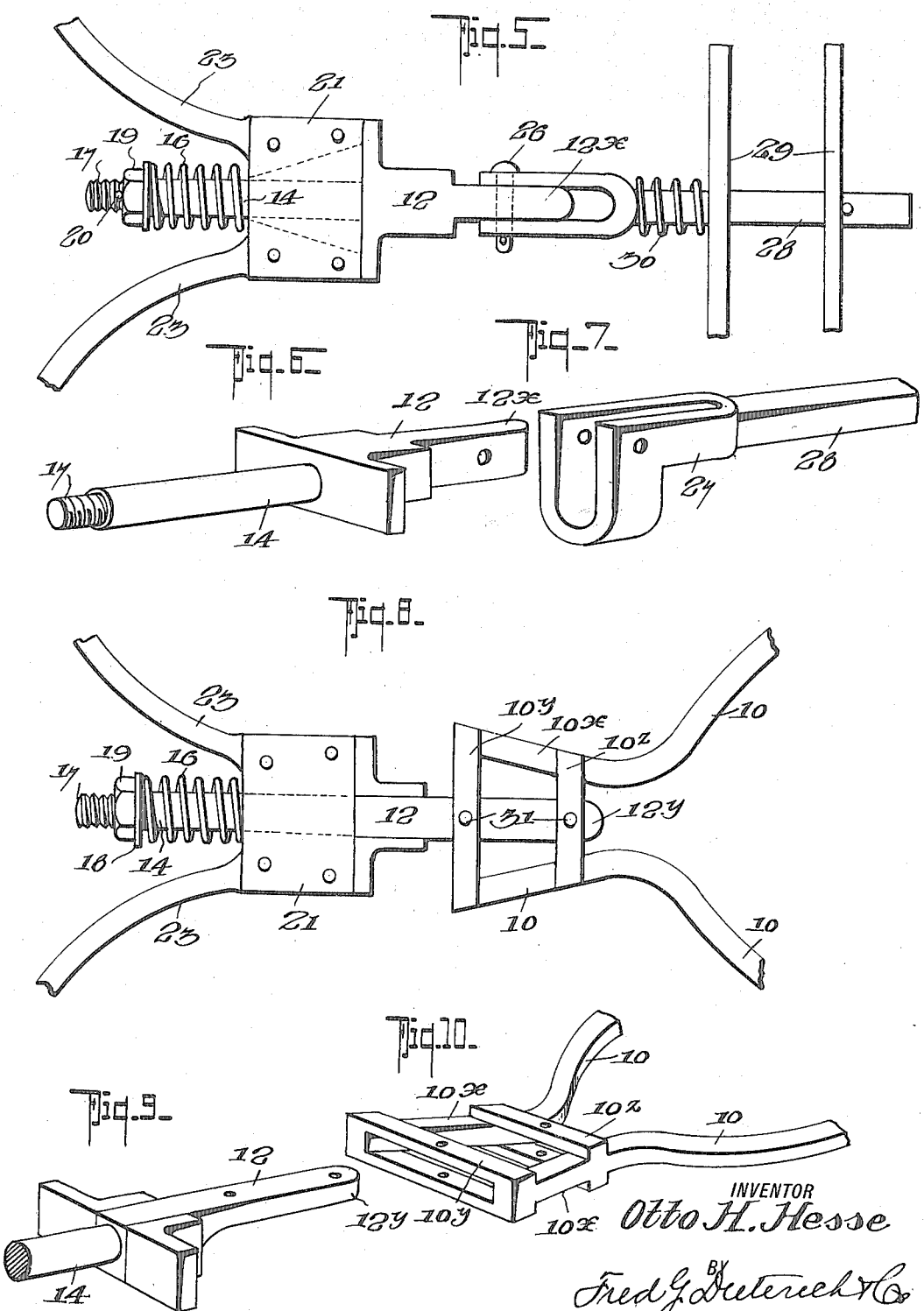

UNITED STATES PATENT OFFICE.

OTTO H. HESSE, OF LEAVENWORTH, KANSAS, ASSIGNOR TO THE WM. G. HESSE & SON MFG. CO., INCORPORATED, OF LEAVENWORTH, KANSAS.

TRAILER RUNNING-GEAR AND TOWING CONNECTION.

1,212,949.   Specification of Letters Patent.   Patented Jan. 16, 1917.

Application filed April 21, 1916. Serial No. 92,724.

*To all whom it may concern:*

Be it known that I, OTTO H. HESSE, residing at Leavenworth, in the county of Leavenworth and State of Kansas, have invented certain new and useful Improvements in Trailer Running-Gears and Towing Connections, of which the following is a specification.

My invention is a new and improved running gear and towing coupling therefor designed especially for use in connection with automobiles whereby bodies of various sorts may be towed behind an automobile in such manner that the wheels of the trailer will "track" perfectly with the rear wheels of the automobile.

Another object of my invention is to provide a trailer running gear of a light construction in which the axle units are arranged as short-turn members whereby the trailer can turn in a smaller circle.

The invention also resides in the provision of a novel connection between the running gear proper of the trailer and the rear axle of the automobile whereby the front wheels of the trailer will positively "track" with the rear wheels of the automobile, and by virtue of the short-turn connections between the front and rear trailer axle units, the rear wheels of the trailer will "track" with the front wheels of the trailer and consequently with the rear wheels of the automobile whereby the automobile operator may be assured that when he makes a turn around an object which the rear wheels of the auto will clear, the trailer will also clear, thus making it necessary for the automobile operator to only give attention to the running of the automobile in the usual way.

Another object of my invention is to provide means whereby a quick coupling can be had between the towing vehicle and the trailer regardless of whether or not the two vehicles are set on level ground or are level with relation to each other or in alinement with each other so that a quick and effective coupling between the towing vehicle and the trailer can be had.

The invention also resides in those novel details of construction, combination and arrangement, all of which will be first fully described, then be specifically pointed out in the appended claims, and illustrated in the accompanying drawing, in which:

Figure 1 is a top plan view of the invention, the rear axle and wheels of the automobile being shown in full lines. Fig. 2 is an enlarged plan view and part section of the coupling device in the towing connection. Fig. 3 is a side elevation of the same. Fig. 4 is a diagrammatic view showing how the trailer wheels "track" with the rear wheels of the automobile. Fig. 5 is a top plan, parts being broken away showing the towing connection adapted for connection with the cross beam of the towing truck. Figs. 6 and 7 are detail perspective views of parts of the construction shown in Fig. 5. Fig. 8 is a modification of the construction shown in Figs. 1 and 2, designed so that an easy coupling of the towing and trailing vehicles can be made regardless of whether or not the vehicles are in alinement or on level ground. Figs. 9 and 10 are detail perspective views of parts of the construction shown in Fig. 8. Fig. 11 is a perspective view showing a modification of the construction shown in Fig. 10, which is especially adapted for connection to the cross beam of a towing motor truck for heavy draft work. Fig. 12 is a top plan view of a further modification of the invention adapted to be used in towing two wheeled trailers, the construction being especially adapted for coupling with the rear spring by bolts to a Ford Model T car. Fig. 13 is a side elevation of the parts shown in Fig. 12 one of the side braces being removed.

In the drawing, in which like letters and numerals of reference indicate like parts in all of the figures, it will be seen that the front and rear axle units of the trailer are of the same construction and each consists of an axle proper 1, a set of "Ludlow" springs 2, spring hangers 3, coupling shackles 4 and 5, and fifth wheels 6, the latter being designed to receive the body of the trailer, which body, it should be understood may be of any design, depending upon the work to be performed by the trailer. The shackles 4 are joined by crossed reaches 8 that are coupled to the shackles with a hinge coupling 9, the axis of which is vertical, a bridge piece $8^x$ serving to limit the turning of the axles. The towing connection, which constitutes a part of the invention and is designed to enable the trailer to positively "track" with the rear wheels of the auto consists of bows 10 connected to the shackles 5 at one end of the trailer running gear on a horizontal axis so as to be susceptible of up and down movement. The bow sections 10 are secured to one end 12 of a draw bar bolt 14 by rivets or other suitable fastening devices 5, and the front ends of the bow sections 10 are sustained at right angles in opposite directions to form abutments 10$^a$ to engage the ends of the blocks 22 and the top and bottom plates 21. 23 designates the bow members that are coupled at 24 to the rear axle 25 of the automobile and are connected for pivotal motion on a horizontal axis. The adjacent ends of the bow members 23 are formed as blocks 22 whose opposing faces diverge toward the right angle extensions 10, as is best shown in Fig. 2 of the drawings, so as to provide a fulcrum space for the bolt 14 which bolt may be moved horizontally (see dotted lines Fig. 2), within the confines of the triangular space between the blocks 22.

15 is a washer on the bolt 14 against which and against a second washer 18, the buffer spring 16 is located, the projecting end of the bolt 14 being threaded at 17 to receive the nut 19 which is held from coming off by a cotter pin 20 or other suitable device. Upper and lower plates 21 are riveted or otherwise secured together to the blocks 22 to form a rigid structure.

In practice, it will be observed that the provision of the special towing connection referred to provides a buffer or resilient towing connection to absorb shocks of sudden stopping and starting and the connection is such that any unevenness in the roadbed will be compensated for, since the bolt 14 will have a turning movement on its axis as well as a lateral movement within the confines of the space between the opposing face of the blocks 22.

In turning, the parts assume the position indicated in Fig. 4, and by reason of the design of the parts and the coöperation of the same, the wheels of the trailer running gear will positively "track" with the rear wheels of the automobile as has been demonstrated in actual practice with this invention.

In the form shown in Fig. 5, the arms 23 are connected with the trailer shackles instead of to the towing vehicle in the same manner as shown in Fig. 1, and in lieu of the arms 10, the end 12 of the draw bolt 14 is extended at 12$^x$ and pivotally pin-connected at 26 with the bifurcated end 27 of a draw bar 28 that is mounted in apertures in the cross bars 29 of the towing vehicle, the bar 28 being provided with a buffer spring 30 to absorb the shock. This construction is adapted for heavy truck connections. It will be seen, however, that the connection, in principle, is the same as the form shown in Fig. 1, that is, the arms 23 have a horizontal pivotal connection at the shackle ends the same as in the form in Fig. 1, the lateral pivotal movement being obtained by the connection between the draw bolt 14 and the socket 21 and the second horizontal pivotal connection is obtained at the pin 26.

In the form shown in Fig. 10, the arms 10 are not rigidly connected to the portion 12 of the draw bolt, but the draw bolt is extended as at 12$^y$ to fit between the cross bars 10$^y$—10$^z$ which are secured to the flange ends 10$^x$ of the arms 10 and pins 31 are provided for rigidly pinning the body 12$^y$ to the cross bars 10$^y$—10$^z$. In this form the horizontal pivotal movements are obtained at the ends of the arms 23 and 10, as in the form shown in Fig. 1, while the lateral movement is obtained, as before, in the coupling member, between the draw bolt 14 and the socket 21. The advantage of the construction shown in Fig. 8 is that should the trailing vehicle be directed at an angle to the towing vehicle, the end 12$^y$ of the draw bolt can be passed into the flared end of the arms 10 and the pin 31 through the cross bars 10$^z$ can be put in place and after the towing vehicle has drawn the towed vehicle into alinement the pin 31 through the cross bars 10$^x$ can be inserted and the rigid coupling thus effected.

The modification of the form shown in Figs. 8, 9 and 10, which is shown in Fig. 11, is especially adapted for heavy draft work and in this application the arms 10 are dispensed with and parallel arms 10$^r$ are provided to which the cross bars 10$^y$—10$^z$ are secured and the arms 10$^r$ are provided with eyes 10$^s$ which are hinged by a cross bolt 10$^p$ to the draw bolts 10$^m$ that pass through the cross bar 29$^x$ of the truck and are provided with buffer springs 30$^x$, as clearly shown in Fig. 11.

In the form shown in Fig. 12, the arms 23$^x$ are flattened at 23$^y$ and provided with bolt holes 23$^z$ whereby the same may be securely clamped to the rear spring clips of the Ford Model T car in a rigid manner.

On two-wheeled towing vehicles, a tongue 32 is provided which is braced to the body by side irons 33. The side irons 33 project to the end of the tongue 32 and are provided with upward and downward extensions 34—34 that have a series of pin holes 35. The rear end 12 of the draw bolt 14, in this form, is extended to project between the ears 34 and is adapted to be pivotally pin-connected at 36 to the said ears. In this way, the two horizontal pivots are obtained, one at the bolt 36 and the other in the axle of the towed vehicle, the lateral movement being obtained as in the other forms in the coupling 21 proper. This form of the invention is especially adapted for towing light two-wheeled carts or vehicles.

While I have shown several modifications of the generic invention, I do not desire it to be understood as limiting myself to those particular constructions as further modifications in the details of parts may be made necessary to adapt the invention to particular uses.

What I claim is:

1. In combination with a short turn trailer consisting of front and rear axle units and cross reaches connecting said units and fifth wheels on which said axles turn; and in combination with a towing vehicle having a fixed towing axle; a coupling device consisting of a pair of coupling members connected with one of said trailer axle units for movement on a horizontal axis, a second pair of coupling members adapted for connection with the towing vehicle, a body carried by one pair of coupling members and having a V-shaped longitudinal opening and a flat outer face, a draw bar carried by the other pair of members and having a head provided with a flat surface to engage said flat face, said draw bar projecting through said opening and a buffer spring on said draw bar continuously tending to pull said flat surface into engagement with said flat face.

2. In combination with a short-turn trailer consisting of front and rear axle units and crossed reaches connecting said units and fifth wheels on which said axles turn; and in combination with a towing vehicle having a fixed towing axle; of a coupling member consisting of a pair of coupling irons connected with one of said trailer axle units for movement on a horizontal axis, a second pair of coupling members adapted for connection with the towing vehicle, a draw bar connection between said pairs of coupling members, said draw bar connection comprising a bolt secured to one pair of coupling members, a body carried by the other pair of coupling members and having a passage through the same, the side walls of said passage diverging, said bolt passing through said passage, a buffer spring on said bolt and an adjusting nut coöperating with said buffer spring.

3. In combination with a short-turn trailer running gear, the axles of which are pivoted on fifth wheels and a towing vehicle, the rear axle of which is relatively fixed, of a coupling connection between said fixed axle and one of the axles of the trailer, said coupling connection comprising a pair of bow members pivoted to the trailer axle on a horizontal axis, a second pair of bow members pivoted to the towing vehicle on a horizontal axis and a buffer draw bar connection between said pair of bow members which comprises a body having a longitudinally V-shaped passage and a flat face normal thereto, a draw bolt passing through said passage and having a flat head to engage said flat face, and a buffer spring on said draw bolt to continuously tend to bring said flat head and flat face into engagement, said bow members and said draw bar connection being so designed that the distance between the towing vehicle axle and the adjacent trailer axle is equal to the distance between the centers of the trailer axles whereby said buffer draw bar connection will lie in substantially the mid-position between the towing vehicle axle and the trailer axle to cause the trailer wheels to track with the wheels on the axle of the towing vehicle substantially as shown and described.

4. A towing connection which includes a body having a V-shaped opening, means for connecting said body to a vehicle, said body having a flat end face, a draw bar having a head provided with a flat surface to engage said flat face, said draw bar projecting through said opening and a buffer spring for holding said draw bar under tension to continuously tend to bring said head into engagement with said body.

5. In a towing connection for vehicles, a body having a passage through the same diverging from one end toward the other, arms projecting from said body, means adapted for connecting said arms to a vehicle, a draw bar projecting through said body passage, said draw bar having a head to engage said body, a buffer spring on said draw bar in engagement with said body said spring being adapted to hold said head in engagement with said body and tending to bring said draw bar into alinement regardless of the divergence of the slot, and a towing connection between said draw bar and another vehicle, said towing connection being such that said draw bolt will always lie in the same longitudinal position with relation to the adjacent axle of the vehicle with which it is directly connected.

6. A towing connection comprising a body adapted to be connected with one vehicle and having a laterally widened passage through the same, a draw bar adapted to be connected with another vehicle, a head rigidly located on the draw bar and having a flat surface perpendicular to the axis of the draw bar, said draw bar projecting through said opening and longitudinally slidable and laterally movable in said opening and a spring for urging the draw bar longitudinally to bring the flat surface of the head into contact with the flat surface of the body, thus tending to hold the adjacent axles of the two vehicles in parallel relation.

7. A towing connection comprising a body adapted to be connected with one vehicle and having a laterally widened passage through the same, a draw bar adapted to be connected with another vehicle, a head rigidly located on the draw bar and having a flat surface perpendicular to the axis of the draw bar, said draw bar projecting through said opening and longitudinally slidable and laterally movable in said opening and a spring for urging the draw bar longitudinally to bring the flat surface of the head into contact with the flat surface of the body, thus tending to hold the adjacent axles of the two vehicles in parallel relation, said spring being adapted to be compressed by a pulling string and acting as a shock absorber.

8. In a towing connection for vehicles, a body having a passage through the same of substantially V-shape, bow arms rigidly carried by said body, said bow arms terminating in connecting ears adapted for horizontal pivotal connection with a vehicle, a draw bolt passing through said body and having lateral pivotal movement in said body, a buffer device on said draw bolt for positively applying tension to said bolt in one direction, a head member on said draw bolt for engaging said body to hold the draw bolt normally in alinement with the longitudinal axis of said body, and a draft connection between said draw bolt and the vehicle with which it is adapted to be connected.

9. In a towing connection for vehicles, a body having a passage through the same of substantially V shape, bow arms rigidly carried by said body, said bow arms terminating in connecting ears adapted for horizontal pivotal connection with a vehicle, a draw bolt passing through said body and having lateral pivotal movement in said body, a buffer device on said draw bolt for positively applying tension to said bolt in one direction, a head member on said draw bolt for engaging said body to hold said draw bolt normally in alinement with the longitudinal axis of said body, a draft connection between said draw bolt and the vehicle with which it is adapted to be connected, said draft connection including a member adapted to be horizontally pivotally connected to the vehicle.

10. In a towing connection for vehicles, a body having a passage through the same of substantially V shape, bow arms rigidly carried by said body, said bow arms terminating in connecting ears adapted for horizontal pivotal connection with a vehicle, a draw bolt passing through said body and having lateral pivotal movement in said body, a buffer device on said draw bolt for positively applying tension to said bolt in one direction, a head member on said draw bolt for engaging said body to hold said draw bolt normally in alinement with the longitudinal axis of said body, a draft connection between said draw bolt and the vehicle with which it is adapted to be connected, said draft connection including a draft body and a pivotal connection between said draft body and said draw bolt.

11. A towing connection comprising a body adapted to be connected with one vehicle and having a laterally widened passage through the same, a draw bar adapted to be connected with another vehicle, a head rigidly located on the draw bar and having a flat surface perpendicular to the axis of the draw bar, said draw bar projecting through said opening and longitudinally slidable and laterally movable in said opening and a spring for urging the draw bar longitudinally to bring the flat surface of the head into contact with the flat surface of the body, thus tending to hold the adjacent axles of the two vehicles in parallel relation, said draw bar having rotation on its longitudinal axis within said body opening.

12. A towing connection comprising a body adapted to be connected with one vehicle and having a laterally widened passage through the same, a draw bar adapted to be connected with another vehicle, a head rigidly located on the draw bar and having a flat surface perpendicular to the axis of the draw bar, said draw bar projecting through said opening and longitudinally slidable and laterally movable in said opening and a spring for urging the draw bar longitudinally to bring the flat surface of the head into contact with the flat surface of the body, thus tending to hold the adjacent axles of the two vehicles in parallel relation, said spring being adapted to be compressed by a pulling string and acting as a shock absorber, said draw bar having rotation on its longitudinal axis within said body opening.

OTTO H. HESSE.